(12) United States Patent
Nie et al.

(10) Patent No.: US 8,023,571 B2
(45) Date of Patent: Sep. 20, 2011

(54) IMPULSE ULTRA-WIDEBAND RADIO COMMUNICATION SYSTEM

(76) Inventors: Hong Nie, Calgary (CA); Zhizhang Chen, Halifax (CA)

( * ) Notice: Subject to any disclaimer, the term of this patent is extended or adjusted under 35 U.S.C. 154(b) by 753 days.

(21) Appl. No.: 12/103,117

(22) Filed: Apr. 15, 2008

(65) Prior Publication Data
US 2009/0258669 A1 Oct. 15, 2009

(51) Int. Cl.
*H04L 27/00* (2006.01)
(52) U.S. Cl. .................. 375/256; 375/146; 375/295
(58) Field of Classification Search ............ 375/130, 375/140, 146, 219, 256, 260, 267, 295, 299
See application file for complete search history.

(56) References Cited

U.S. PATENT DOCUMENTS

| | | | |
|---|---|---|---|
| 7,660,230 B2 * | 2/2010 | Kim et al. | 370/203 |
| 7,729,407 B2 * | 6/2010 | Sahinoglu et al. | 375/138 |
| 2007/0147476 A1 * | 6/2007 | Merz et al. | 375/130 |
| 2007/0291834 A1 * | 12/2007 | Toumazou et al. | 375/239 |
| 2010/0020851 A1 * | 1/2010 | Ekbal et al. | 375/130 |

* cited by examiner

*Primary Examiner* — Dac Ha
(74) *Attorney, Agent, or Firm* — Marks & Clerk; S. Mark Budd

(57) ABSTRACT

A method and apparatus are provided for implementing an impulse ultra-wideband communications system which combines the technique of transmitted reference (TR) with a code-sifted reference scheme that separates the reference and the data pulses with a sequence of codes such as a subset of Walsh codes. The combination of the two techniques in ultra-wideband (UWB) radio systems removes the wideband delay elements required by conventional TR UWB systems. The invention provides a system with no analog carriers and lower complexities than other UWB systems, and which has better performances, higher tolerance to nonlinearity, and larger capacities.

18 Claims, 6 Drawing Sheets

IMPULSE ULTRA-WIDEBAND RADIO COMMUNICATION SYSTEM

FIELD OF THE INVENTION

The invention relates to radio communication systems, and in particular to ultra wideband (UWB) radio communication systems.

BACKGROUND OF THE INVENTION

There are numerous radio communication techniques for transmitting digital data over a wireless channel. These techniques are used in mobile telephone systems, pagers, remote data collection or sensor systems, and wireless networks for computers, among others. Most conventional wireless communication techniques modulate the digital data onto either a high-frequency carrier or narrow pulses that are then transmitted via an antenna.

One such technique is ultra wideband (UWB). An UWB system is defined as a system that transmits radio signals over either a bandwidth of at least 20% of its center frequency or a −10 dB bandwidth of at least 500 MHz. One existing unlicensed frequency band for UWB systems is defined by the US Federal Communications Commission as 3.1-10.6 GHz, with a given spectral mask requirement for both indoor and outdoor applications. One widely used signaling technology to utilize such a wide bandwidth is the impulse radio (IR) UWB technology. IR-UWB technology transmits pulses or pulsed waveforms of very short duration. Since these short duration pulses can be transmitted without use of a carrier, IR-UWB systems have the advantages of low complexity, low power requirements, and good time-domain resolution for location and tracking applications. These advantages provide the IR-UWB with great potential to be employed in wireless applications including sensor networks.

Unfortunately, transmitting short duration pulses also introduces a critical problem in the receiver design of an IR-UWB system. In multipath environments, especially non-line-of-sight (NLOS) environments, the received IR-UWB signals consist of a large number of resolvable multipath components (MPCs), the number of which is much higher than in any other wireless communication system. Generally, for the received signals with resolvable MPCs, the Rake receiver can effectively capture the signal energy spread among the MPCs by assigning each MPC a detecting finger. However in order to precisely match the amplitude, phase, and delay of a specific MPC, each detecting finger requires an individual set of channel estimation, multipath acquisition, and tracking operations. The system complexity of the Rake receiver consequently becomes unacceptably high when the number of detecting fingers is large. In order to balance performance and complexity of the IR-UWB system, some Rake receivers only assign a limited number of detecting fingers to the strongest resolvable MPCs. This type of Rake receiver is called a selective Rake receiver.

In order to capture energy from more MPCs while still maintaining low system complexity, a transmitted reference (TR) transceiver has been developed to detect IR-UWB signals in multipath environments. In each frame, the TR transmitter transmits two pulses, a reference pulse and a modulated data pulse, separated by a time duration known by the TR receiver. At the receiver side, the TR receiver correlates the received IR-UWB signals with their delayed version containing the reference pulse to recover the transmitted information bits. Since both the reference pulse and the data pulse suffer the same multipath fading, the reference pulse provides a perfect template to detect the data pulse. Hence the TR receiver does not need explicit channel estimation, multipath acquisition, and tracking operations. The TR receiver can therefore capture energy from more MPCs with a lower system complexity than an IR-UWB system which does not employ delayed reference pulses.

However, the TR technique requires a delay element with ultra-wide bandwidth, up to several gigahertz, in order to provide the delayed version of the IR-UWB signals. This is very difficult to realize in low complexity and low power IR-UWB systems, especially in an integrated circuit.

A different approach to detecting MPCs has recently been developed, in which a slightly frequency-shifted reference (FSR) is used to replace the time-shifted reference in the TR transmitter so as to remove the delay element from the TR receiver. In the transmitter of a FSR system, a reference pulse sequence and one or more data pulse sequences are transmitted simultaneously, but each data pulse sequence is shifted slightly in the frequency domain by multiplying a specific frequency tone. On the receiver side, the reference pulse sequence is shifted by the same set of frequency tones to detect each data pulse sequence. Since the separation of the reference pulse sequence and the data pulse sequence is implemented in the frequency domain rather than the time domain, the receiver does not require a delay element.

However the FSR technique employs analog carriers to shift IR-UWB signals in both the transmitter and receiver sides. This increases the complexity of the FSR transceiver, which weakens the advantages gained from removing the delay element. Furthermore an FSR transceiver has lower performance than a TR transceiver because the FSR transceiver can be affected by frequency inaccuracy caused by oscillator mismatch, phase inaccuracy caused by multipath fading, and amplitude inaccuracy caused by nonlinear amplifiers.

An IR-UWB technique which does not require a delay element and which does not use an analog carrier would provide the performance advantages of a TR transceiver without the complexity inherent in a delay element.

SUMMARY OF THE INVENTION

In accordance with one aspect of the invention, a method of transmitting and receiving information bits in a UWB radio communication system is provided. A reference bit and at least one information bit are encoded using shifting codes. A series of UWB pulses is modulated with modulation amplitudes determined from the encoded reference bit and the at least one encoded information bit. The modulated series of UWB pulses is transmitted as a signal. The signal is received and decoded using detection codes.

In accordance with another aspect of the invention, a UWB radio communication system is provided. The UWB radio communication system includes means for generating a series of wideband pulses containing an encoded reference bit and at least one encoded information bit. The UWB radio communication system includes a transmitter having an antenna for transmitting the UWB pulses as a signal. The UWB radio communication system includes a receiver having an antenna for receiving the signal. The UWB radio communication system includes means for decoding the signal to recover the at least one information bit.

The methods of the invention may be stored as processing instructions on computer-readable media.

The methods and apparatus of the present invention provide a low complexity yet high performance IR-UWB technique. Rather than using frequency shifting or time shifting, the reference pulse sequence is shifted from the data pulse sequences using code shifting. The joint use of shifting codes (at the transmitter) and detection codes (at the receiver) enable correct detection of information bits from the reference pulse sequence and data pulse sequences which are transmitted simultaneously. The use of digital sequences removes the need for complex analog components at the receiver.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
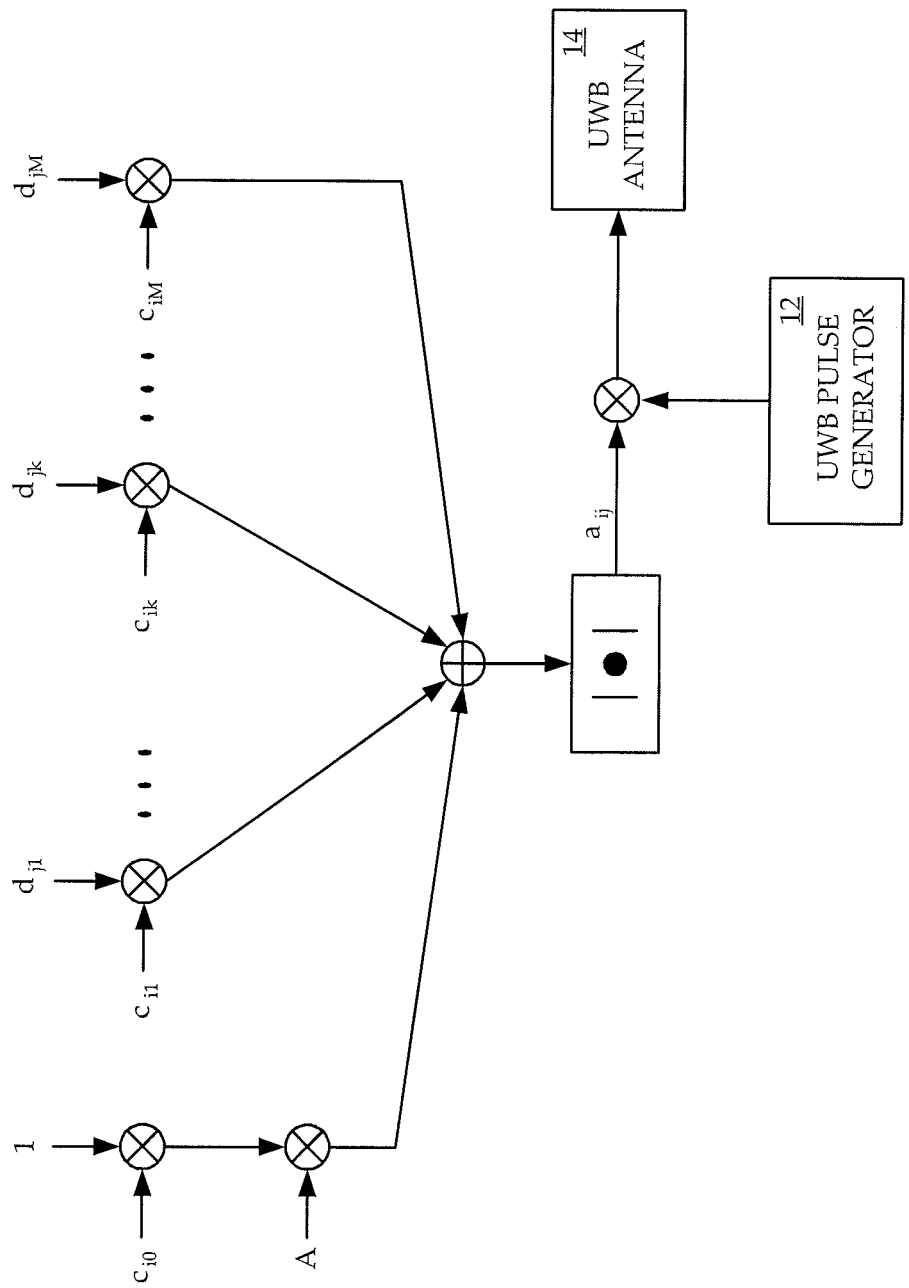
FIG. 1 is a block diagram of a code shifted reference ultra-wideband (UWB) transmitter according to one embodiment of the invention.

Referring to FIG. 1, a block diagram of a code shifted reference ultra-wideband (UWB) transmitter according to one embodiment of the invention is shown. A reference bit '1' and M information bits $\{b_{j1}, b_{j2}, \ldots b_{jM}\}$, with $b_{jk} \in \{1,-1\}$, are transmitted simultaneously by modulating the amplitudes of $N_f$ UWB pulses. j is the group index when the information bits are divided into multiple groups of M bits each. As can be seen from FIG. 1, a modulating amplitude $a_{ij}$ for the $i^{th}$ pulse is determined as $$a_{ij} = \left| A c_{i0} + \sum_{k=1}^{M} d_{jk} c_{ik} \right|$$

where A is a constant, $\{d_{j1}, d_{j2}, \ldots d_{jM}\}$ are processed information bits (determined from the information bits $b_{jk}$ as explained below), the subscript i indicates the pulse number, and $\{c_0, c_1, \ldots c_k, \ldots c_M\}$ are M+1 shifting codes with $c_k = [c_{0k}, c_{1k}, \ldots, c_{ik}, \ldots, c_{(N_f-1)k}]$ and $c_{ik} \in \{1,-1\}$. The modulating amplitude $a_{ij}$ is applied to the $i^{th}$ pulse generated by a UWB pulse generator 12, and the modulated pulse (along with the other $N_f-1$ modulated pulses) are sent to a UWB antenna 14 where they are transmitted into a transmission medium. In this way, the M information bits and the reference bit are code shifted using the shifting codes and transmitted simultaneously.

The shifting codes $c_k$ are used in conjunction with detection codes, $\tilde{c}_k$. The relationship between the shifting codes and detection codes will be described below. The invention envisages different types of code shifted reference UWB schemes, and the value of A, the determination of the processed information bits $d_{jk}$ from the information bits $b_{jk}$, and constraints on the shifting codes $c_k$ and detection codes $\tilde{c}_k$ are based on the type of code shifted reference UWB scheme that is used. Two types of code shifted reference UWB schemes are presented as examples.

One type of code shifted reference UWB scheme uses direct code shifted references. In the direct coded shifted reference UWB scheme the information bits $b_{jk}$ are directly coded by the shifting codes $c_k$. In other words, the processed information bits $d_{jk}$ to which the shifting codes are applied are the same as the information bits $b_{jk}$. The following constraints and value determinations are used:

$$A = \sqrt{M}$$

$$d_{jk} = b_{jk}, \forall k \in \{1,2, \ldots, M\}$$

$$\sum_{i=0}^{N_f-1} \tilde{c}_{ik} = 0, \forall k \in \{1,2, \ldots, M\}$$

$$\sum_{i=0}^{N_f-1} \tilde{c}_{ik} c_{i0} c_{il} = \begin{cases} 0, & k \neq l, \\ N_f, & k = l, \end{cases} \forall k, l \in \{1,2, \ldots, M\}$$

$$\sum_{i=0}^{N_f-1} \tilde{c}_{ik} c_{il} c_{in} = 0, \forall k, l, n \in \{1,2, \ldots, M\}$$

M detection codes $\tilde{c}_k$ are used since, as will be described below with reference to FIG. 3, one detection code is used to recover each information bit.

As an example, Walsh codes which satisfy the following two rules result in shifting codes and detection codes which satisfy the three conditions described above:

$$\tilde{c}_k = c_0 c_k, \forall k \in \{1, 2, \ldots, M\},$$

$$c_l c_n \neq \tilde{c}_k, \forall k, l, n \in \{1, 2, \ldots, M\}.$$

For Walsh codes of length $2^N$, at most $2^{N-1}+1$ shifting codes and $2^{N-1}$ detection codes can be selected which satisfy the two rules given above. The length of the Walsh codes used, $2^N$, is the same as the number of UWB pulses per group, $N_f$.

Table 1 presents example sets of shifting codes and detection codes for the direct code shifted reference UWB scheme. The table presents codes for three different values $N_f$ of the number of pulses used to transmit each group of information bits. As can be seen, when $N_f = 2^N$, at most $M = 2^{N-1}$ information bits can be transmitted simultaneously. Therefore the number of information bits per group determines the length of the Walsh codes that is needed, or conversely the length of the Walsh codes used determines the number of information bits per group.

TABLE 1

| Code Length | $N_f = 2$ | $N_f = 4$ | $N_f = 8$ |
|---|---|---|---|
| Shifting codes | $c_0 = [1, 1]$ | $c_0 = [1, 1, 1, 1]$ | $c_0 = [1, 1, 1, 1, 1, 1, 1, 1]$ |
| | $c_1 = [1, -1]$ | $c_1 = [1, -1, 1, -1]$ | $c_1 = [1, -1, 1, -1, 1, -1, 1, -1]$ |
| | | $c_2 = [1, 1, -1, -1]$ | $c_2 = [1, 1, -1, -1, 1, 1, -1, -1]$ |
| | | | $c_3 = [1, 1, 1, 1, -1, -1, -1, -1]$ |
| | | | $c_4 = [1, -1, -1, 1, -1, 1, 1, -1]$ |
| Detection | $\tilde{c}_1 =$ | $\tilde{c}_1 = [1, -1, 1, -1]$ | $\tilde{c}_1 = [1, -1, 1, -1, 1, -1, 1, -1]$ |

TABLE 1-continued

| Code Length | $N_f = 2$ | $N_f = 4$ | $N_f = 8$ |
|---|---|---|---|
| codes | $[1, -1]$ | $\tilde{c}_2 = [1, 1, -1, -1]$ | $\tilde{c}_2 = [1, 1, -1, -1, 1, 1, -1, -1]$ |
| | | | $\tilde{c}_3 = [1, 1, 1, 1, -1, -1, -1, -1]$ |
| | | | $\tilde{c}_4 = [1, -1, -1, 1, -1, 1, 1, -1]$ |

Another type of code shifted reference UWB scheme uses differential code shifted references. In the differential coded shifted reference UWB scheme, the information bits $b_{jk}$ are first encoded differentially before being coded by the shifting codes $c_k$. The following constraints and value determinations are used:

$$A = 1$$

$$d_{jk} = \prod_{l=1}^{k} b_{jl} \; \forall \, k \in \{1, 2, \ldots, M\}$$

$$\sum_{i=0}^{N_f - 1} \tilde{c}_{iln} = 0, \forall \, l \in \{0, 1, \ldots, M-1\}$$

and $$\forall \, n \in \{l+1, l+2, \ldots, M\}$$

$$\sum_{i=0}^{N_f - 1} \tilde{c}_{iln} c_{ip} c_{iq} = \begin{cases} N_f, & l = p \text{ and } n = q, \\ 0, & \text{others,} \end{cases}$$

$$\forall \, l, p \in \{0, 1, \ldots, M-1\}$$

and $\forall \, n, q \in \{1, 2, \ldots, M\}$ with $$\tilde{c}_{ln} = [\tilde{c}_{0ln}, \tilde{c}_{1ln}, \ldots, \tilde{c}_{iln}, \ldots, \tilde{c}_{(N_f - 1)ln}], \text{ and } \tilde{c}_{iln} \in \{1, -1\}.$$

As an example, Walsh codes which satisfy the following two rules result in shifting codes and detection codes which satisfy the two conditions described above:

$$\tilde{c}_{ln} = c_l c_n, \; \forall \, l \in \{0, 1, \ldots M-1\} \text{ and } \forall n \in \{l+1, l+2, \ldots M\},$$

$$\tilde{c}_{ln} \neq \tilde{c}_{pq} \text{ except } l = p \text{ and } n = q, \; \forall \, l, p \in \{0, 1, \ldots, M-1\} \text{ and } \forall n, q \in \{1, 2, \ldots, M\}.$$

The two rules given above mean that if the number of shifting codes is (M+1), the number of detection codes must be M(M+1)/2. For Walsh codes of length $2^N$, at most $2^N - 1$ codes can be used as detection codes $\tilde{c}_{ln}$. Therefore the number of information bits per group is limited by $$M(M+1)/2 \leq 2^N - 1,$$

where the number of UWB pulses used to transmit each group of information bits, $N_f$, is the same as the length of the Walsh codes, i.e. $2^N$.

Table 2 presents example sets of shifting codes and detection codes for the differential code shifted reference UWB scheme. The table presents codes for three different values $N_f$ of the number of pulses used to transmit each group of information bits.

TABLE 2

| Code Length | $N_f = 2$ | $N_f = 4$ | $N_f = 8$ |
|---|---|---|---|
| Shifting Codes | $c_0 = [1, 1]$ | $c_0 = [1, 1, 1, 1]$ | $c_0 = [1, 1, 1, 1, 1, 1, 1, 1]$ |
| | $c_1 = [1, -1]$ | $c_1 = [1, -1, 1, -1]$ | $c_1 = [1, -1, 1, -1, 1, -1, 1, -1]$ |
| | | $c_2 = [1, 1, -1, -1]$ | $c_2 = [1, 1, -1, -1, 1, 1, -1, -1]$ |
| | | | $c_3 = [1, 1, 1, 1, -1, -1, -1, -1]$ |
| Detection Codes | $\tilde{c}_{01} = [1, -1]$ | $\tilde{c}_{01} = [1, -1, 1, -1]$ | $\tilde{c}_{01} = [1, -1, 1, -1, 1, -1, 1, -1]$ |
| | | $\tilde{c}_{02} = [1, 1, -1, -1]$ | $\tilde{c}_{02} = [1, 1, -1, -1, 1, 1, -1, -1]$ |
| | | $\tilde{c}_{12} = [1, -1, -1, 1]$ | $\tilde{c}_{03} = [1, 1, 1, 1, -1, -1, -1, -1]$ |
| | | | $\tilde{c}_{12} = [1, -1, -1, 1, 1, -1, -1, 1]$ |
| | | | $\tilde{c}_{13} = [1, -1, 1, -1, -1, 1, -1, 1]$ |
| | | | $\tilde{c}_{23} = [1, 1, -1, -1, -1, -1, 1, 1]$ |

Figure 2:
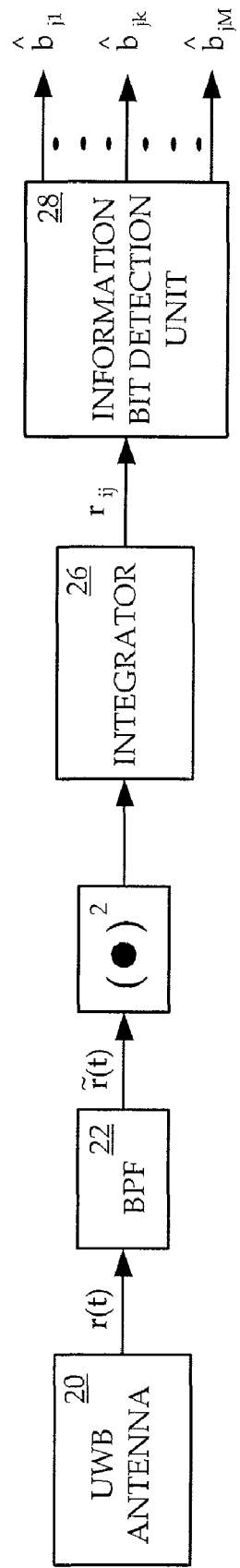
FIG. 2 is a block diagram of a code shifted reference UWB receiver according to one embodiment of the invention.

Referring to FIG. 2, a block diagram of a code shifted reference UWB receiver according to one embodiment of the invention is shown. A UWB antenna 20 receives a UWB signal r(t) and passes it to a bandpass filter 22. The bandpass filter matches the bandwidth of the transmitted UWB signal in order to remove excessive noise and interference. The output of the bandpass filter 22 $\tilde{r}(t)$ is squared and passed to an integrator 26. The integrator 26 integrates the squared signal over a time duration between $(jN_f + i)T_f$ and $(jN_f + i)T_f + T_M$, where $T_f$ is the duration between two UWB pulses and $T_M$ is the duration of a UWB pulse after distorted by a multipath wireless channel. The result of the integration is a series of signal values $r_{ij} = \{r_{0j}, r_{1j}, \ldots r_{ij}, \ldots r_{(N_f - 1)j}\}$, which are passed to an information bit detection unit 28. The information bit detection unit 28 determines M recovered information bits $\{\hat{b}_{j1}, \hat{b}_{j2}, \ldots \hat{b}_{jk}, \ldots \hat{b}_{jM}\}$.

Figure 3:
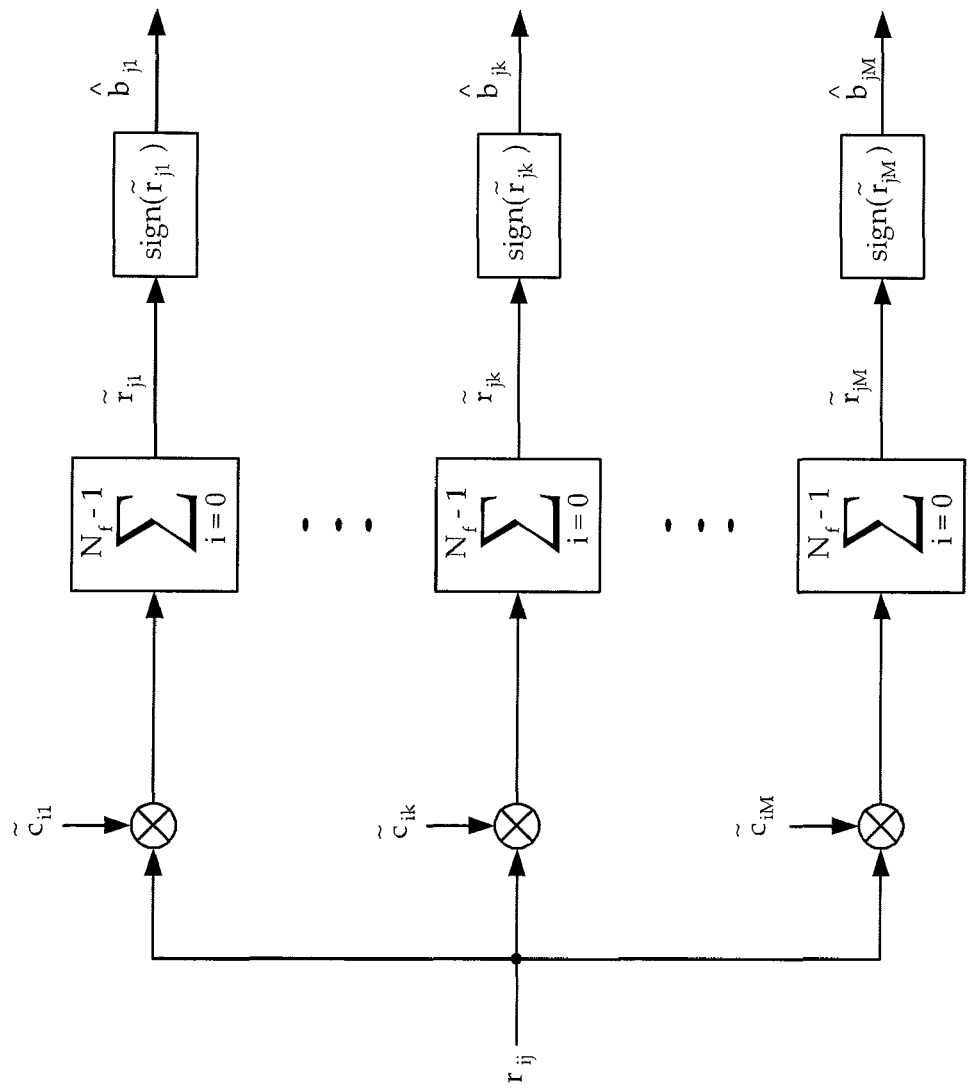
FIG. 3 is a block diagram of the information bit detection unit within the receiver of FIG. 2 according to one embodiment of the invention.

Referring to FIG. 3, a block diagram of the information bit detection unit 28 for direct code shifting according to one embodiment of the invention is shown. Each detection code $\tilde{c}_k$ is correlated with the series of signal values $r_{ij}$ to produce a correlation result $\tilde{r}_{jk}$ (k=1 to M). The M recovered information bits $\hat{b}_{jk}$ are determined by simply determining the sign of each correlation result.

Figure 4:
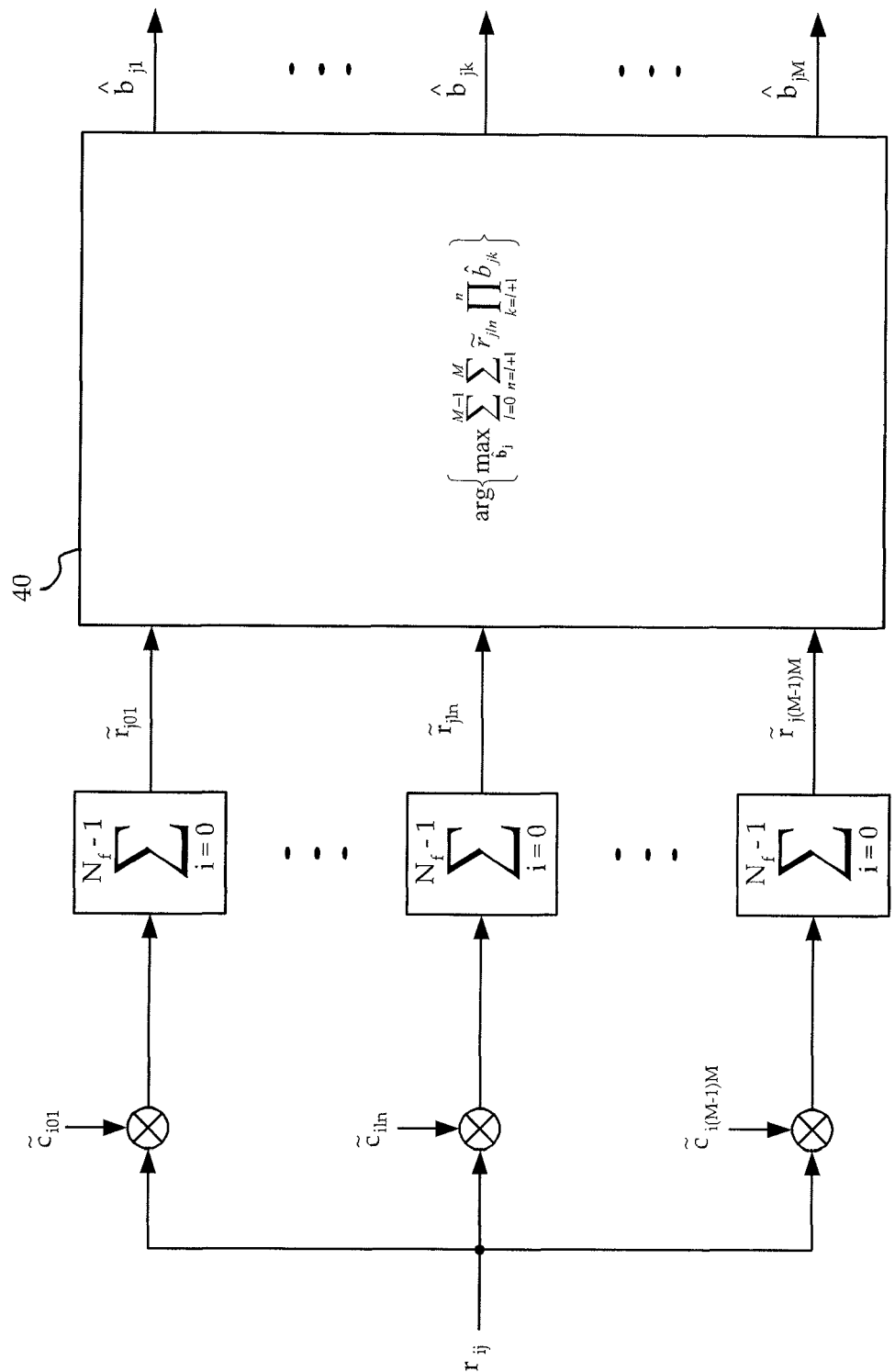
FIG. 4 is a block diagram of the information bit detection unit within the receiver of FIG. 2 according to another embodiment of the invention.

Referring to FIG. 4, a block diagram of the information bit detection unit 28 for differential code shifting according to one embodiment of the invention is shown. Each detection code $\tilde{c}_{ln}$ is correlated with the series of signal values $r_{ij}$ to produce a correlation result $\tilde{r}_{jln}$ (with l=0 to M−1, n=1 to M). The correlation results are passed to a maximal calculator 40 that determines which values of $\hat{b}_j = \{\hat{b}_{j1}, \hat{b}_{j2}, \ldots \hat{b}_{jk}, \ldots \hat{b}_{jM}\}$ result in a maximum value of $$\sum_{l=0}^{M-1} \sum_{n=l+1}^{M} \tilde{r}_{jln} \prod_{k=l+1}^{n} \hat{b}_{jk},$$

that is to say $$\hat{b}_j = \arg \left\{ \max_{\hat{b}_j} \sum_{l=0}^{M-1} \sum_{n=l+1}^{M} \tilde{r}_{jln} \prod_{k=l+1}^{n} \hat{b}_{jk} \right\}.$$

Figure 5:
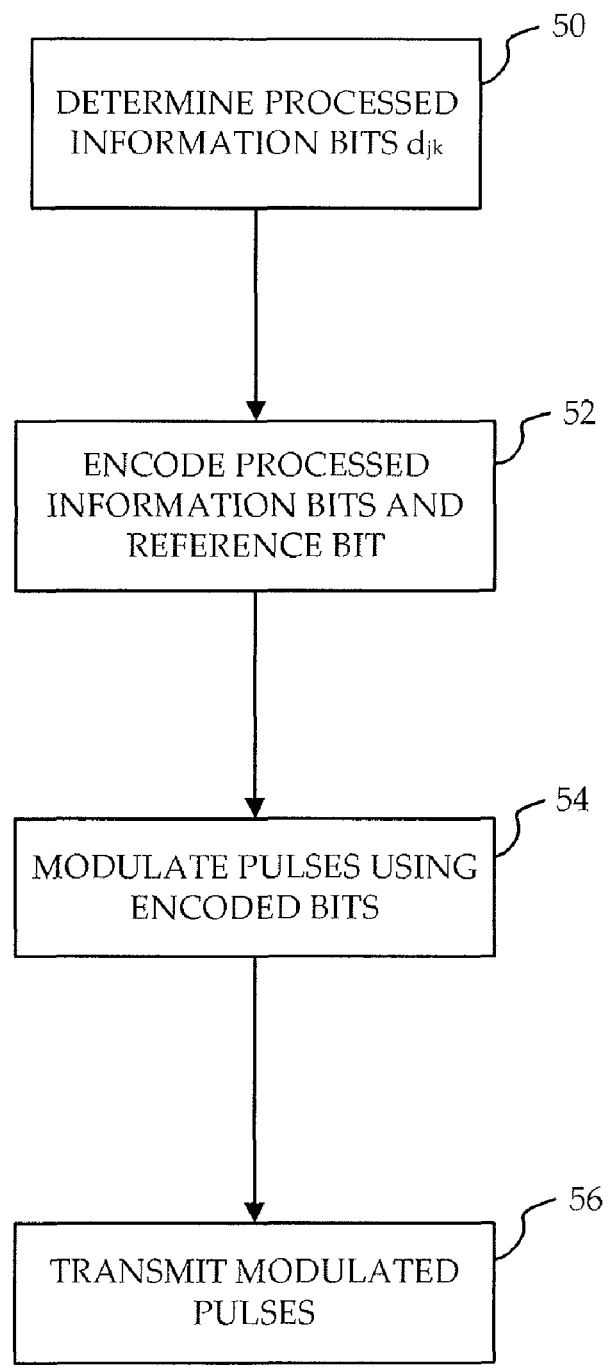
FIG. 5 is a flowchart of a method of transmitting information bits in a UWB radio communication system according to one embodiment of the invention.

Referring to FIG. 5, a flowchart of a method of transmitting information bits in a UWB radio communication system according to one embodiment of the invention is shown. At step 50 the processed information bits $\{d_{j1}, d_{j2}, \ldots d_{jM}\}$ are determined. In the two example schemes above, these are determined either as simply equal to the information bits (in the direct code shifted reference scheme) or as the product of certain information bits (in the differential code shifted reference scheme). At step 52 the processed information bits and a reference bit are encoded using shifting codes $c_k$ as explained above and as seen with reference to FIG. 1. At step 54 UWB pulses are modulated with a modulating amplitude $a_{ij}$ determined from the encoded information bits and the encoded reference bit. At step 56 the modulated UWB pulses are transmitted.

Figure 6:
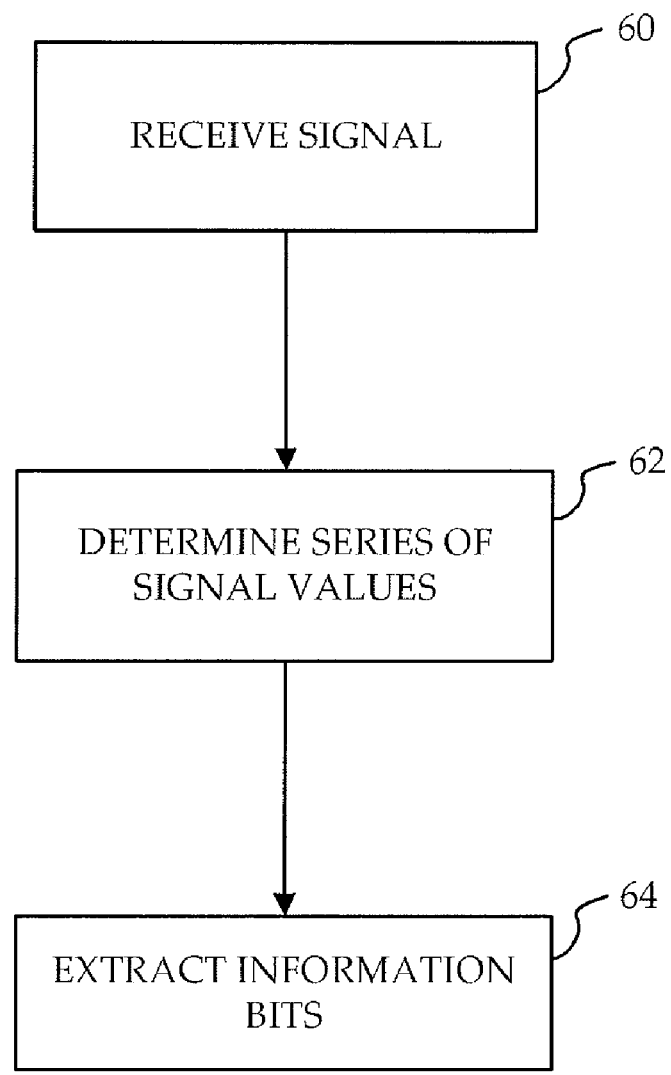
FIG. 6 is a flowchart of a method of receiving and decoding information bits in a UWB radio communication system according to one embodiment of the invention.

Referring to FIG. 6, a flowchart of a method of receiving and decoding information bits in a UWB radio communication system according to one embodiment of the invention is shown. At step 60 a signal is received. At step 62 a series of signal values $r_{ij} = \{r_{0j}, r_{1j}, \ldots r_{ij}, \ldots r_{(N_f-1)j}\}$ is determined. At step 64 information bits $\hat{b}_{jk}$ are extracted from the series of signal values using detection codes. The detection codes are related to the shifting codes used to encode the information bits and reference bit at step 54 of FIG. 5, as described above.

The invention has been described such that Walsh codes are used as the shifting codes and the detection codes. Alternatively other codes could be used, as long as the codes can encode the information bits into $a_{ij}$ as shown in FIG. 1, and recover the information bits from the signal values $r_{ij}$ as shown in FIG. 2. For example, for direct code shifted referencing, any set of codes which satisfy the three conditions set out above for the direct coded shifted reference UWB scheme may be used, or for differential code shifted referencing any set of codes which satisfy the two conditions set out above for the differential coded shifted reference UWB scheme may be used.

The methods of the invention are preferably implemented as hardware in a transmitter and a receiver. For example, the determination of the modulating amplitude $a_{ij}$ in FIG. 1 may be carried out by one or more integrated circuits, as may the bandpass filter, the squaring function, the integrator, and the information bit determination unit of FIG. 2. The invention may alternatively be implemented as software loaded onto a computer processor or other device, although this is less preferable since it would result in slower processing of signals. The methods could also be implemented as a combination of software and hardware. If in the form of software, the logical instructions of the methods may be stored on a computer-readable medium.

The embodiments presented are exemplary only and persons skilled in the art would appreciate that variations to the embodiments described above may be made without departing from the spirit of the invention.

We claim:

1. A method of transmitting and receiving information bits in an ultra-wideband (UWB) radio communication system, comprising:
    encoding a reference bit and at least one information bit using shifting codes;
    modulating a series of ultra-wideband UWB pulses with modulation amplitudes determined from the encoded reference bit and the at least one encoded information bit;
    transmitting the modulated series of UWB pulses as a signal;
    receiving the signal; and
    decoding the received signal using detection codes.

2. The method of claim 1 wherein modulating a series of wideband pulses with modulation amplitudes comprises:
    determining the modulation amplitudes by summing the encoded bits into a sequence of modulating amplitudes; and
    modulating the amplitude of the series of UWB pulses using the absolute value of the modulating amplitudes.

3. The method of claim 1 wherein decoding the received signal comprises:
    generating a series of signal values by squaring and integrating over time the signal; and
    recovering the information bits from the series of signal values.

4. The method of claim 3 wherein recovering the information bits from the series of signal values comprises:
    correlating the series of signal values with a series of detection codes; and
    determining the information bits from the correlation results.

5. The method of claim 4 wherein encoding at least one information bit comprises directly encoding at least one information bit.

6. The method of claim 5 wherein determining the information bits from the correlation results comprises determining each information bit as the sign of a respective one of the correlation results.

7. The method of claim 6 wherein the shifting codes $c_k$ and the detection codes $\tilde{c}_k$ are Walsh codes satisfying the rules $$\tilde{c}_k = c_0 c_k, \forall k \in \{1, 2, \ldots, M\}, \text{ and}$$

$$c_l c_n \neq \tilde{c}_k, \forall k, l, n \in \{1, 2, \ldots, M\},$$

where M is the number of information bits in a group, and k, l, and n are integer indices.

8. The method of claim 4 wherein determining the information bits from the correlation results comprises determining which information bits $\hat{b}_{jk}$ yield a maximum value of $$\sum_{l=0}^{M-1} \sum_{n=l+1}^{M} \tilde{r}_{jln} \prod_{k=l+1}^{n} \hat{b}_{jk},$$

where j is a group number of information bits, M is the number of information bits within the group, k identifies an information bit within the group, and n and l are indices identifying a particular one of the detection codes used to generate a particular one $\tilde{r}_{jln}$ of the correlation results.

9. The method of claim 8 wherein encoding at least one information bit comprises:
    generating processed information bits $d_{jk}$ as $$d_{jk} = \prod_{i=1}^{k} b_{jl} \; \forall \, k \in \{1, 2, \ldots, M\},$$

where $b_{jl}$ is a raw information bit, j is a group number of information bits, M is the number of information bits within the group, k identifies an information bit within the group, and l is a summation index; and
    encoding the processed information bits.

10. The method of claim 9 wherein the shifting codes $c_l$ and the detection codes $\tilde{c}_{ln}$ are Walsh codes satisfying the rules $$\tilde{c}_{ln} = c_l c_n, \forall l \in \{0, 1, \ldots, M-1\} \text{ and } \forall n \in \{l+1, l+2, \ldots M\}, \text{ and}$$

$$\tilde{c}_{ln} \neq \tilde{c}_{pq} \text{ except } l=p \text{ and } n=q, \forall l, p \in \{0, 1, \ldots, M-1\} \text{ and } \forall n, q \in \{1, 2, \ldots, M\},$$

where M is the number of information bits in a group, and l, n, p, and q are integer indices.

11. An ultra-wideband (UWB) radio communication system comprising:

means for generating a series of UWB pulses containing an encoded reference bit and at least one encoded information bit;
a transmitter having an antenna for transmitting the UWB pulses as a signal;
a receiver having an antenna for receiving the signal; and
means for decoding the signal to recover the at least one information bit,
wherein the means for generating the series of UWB pulses comprise means for encoding the reference bit and the at least one information bit with a series of shifting codes; means for summing the encoded bits into a sequence of modulating amplitudes; and means for modulating the amplitude of a series of UWB pulses using the absolute value of the modulating amplitudes.

12. The UWB radio communication system of claim 11 wherein the means for decoding the signal comprise:
means for squaring and integrating over time the signal to generate a series of signal values;
an information bit detection unit for recovering the information bits from the series of signal values.

13. The UWB radio communication system of claim 12 wherein the information bit detection unit comprises:
means for correlating the series of signal values with a series of detection codes; and
means for determining the information bits from the correlation results.

14. The UWB radio communication system of claim 13 wherein the means for encoding the at least one information bit comprise means for directly encoding the at least one information bit.

15. The UWB radio communication system of claim 14 wherein the means for determining the information bits from the correlation results comprise determining each information bit as the sign of a respective one of the correlation results.

16. The UWB radio communication system of claim 15 wherein the shifting codes $c_k$ and the detection codes $\tilde{c}_k$ are Walsh codes satisfying the rules $$\tilde{c}_k = c_0 c_k, \ \forall k \in \{1, 2, \ldots, M\}, \text{ and}$$

$$c_l c_n \neq \tilde{c}_k, \ \forall k, l, n \in \{1, 2, \ldots, M\},$$

where M is the number of information bits in a group, and k, l, and n are integer indices.

17. The UWB radio communication system of claim 15 wherein the shifting codes $c_l$ and the detection codes $\tilde{c}_{ln}$ are Walsh codes satisfying the rules $$\tilde{c}_{ln} = c_l c_n, \ \forall l \in \{0, 1, \ldots M-1\} \text{ and } \forall n \in \{l+1, l+2, \ldots M\}, \text{ and}$$

$$\tilde{c}_{ln} \neq \tilde{c}_{pq} \text{ except } l=p \text{ and } n=q, \ \forall l, p \in \{0, 1, \ldots, M-1\} \text{ and } \forall n, q \in \{1, 2, \ldots, M\},$$

where M is the number of information bits in a group, and l, n, p, and q are integer indices.

18. The UWB radio communication system of claim 12 wherein the means for determining the information bits from the correlation results comprise determining which information bits $\hat{b}_{jk}$ yield a maximum value of $$\sum_{l=0}^{M-1} \sum_{n=l+1}^{M} \tilde{r}_{jln} \prod_{k=l+1}^{n} \hat{b}_{jk},$$

where j is a group number of information bits, M is the number of information bits within the group, k identifies an information bit within the group, and n and l are indices identifying a particular one of the detection codes used to generate a particular one $\tilde{r}_{jln}$ of the correlation results.

* * * * *